United States Patent [19]
Smith

[11] 3,827,526
[45] Aug. 6, 1974

[54] AUTOMOTIVE SECURITY SYSTEM AND SOLENOID LOCK FOR SAME

[75] Inventor: Arthur H. Smith, Maplewood, N.J.

[73] Assignee: Wagner Electric Corporation, Parsippany, N.J.

[22] Filed: Feb. 5, 1973

[21] Appl. No.: 329,592

[52] U.S. Cl. ......... 180/114, 200/61.54, 307/10 AT, 70/255, 123/146.5 B
[51] Int. Cl. ............................................ B60r 25/00
[58] Field of Search ............ 70/252, 254, 255, 181, 70/192–197; 307/10 AT; 200/44, 61.54; 180/114; 123/146.5 B, 198 B; 340/63, 64

[56] References Cited
UNITED STATES PATENTS

| | | | |
|---|---|---|---|
| 1,972,300 | 9/1934 | Hemingway, Jr. | 70/254 |
| 2,964,935 | 12/1960 | Lombardi | 70/252 |
| 3,380,549 | 4/1968 | Hille | 70/254 |
| 3,651,329 | 3/1972 | Marlowe | 70/255 |
| 3,740,568 | 6/1973 | Ikeda | 307/10 AT |

Primary Examiner—James R. Boler
Attorney, Agent, or Firm—Eyre, Mann & Lucas

[57] ABSTRACT

A system including a solenoid and locking block moveable relative to one another and mounted on the steering shaft housing of an automobile to enable actuation of the ignition switch from the LOCK position to the ACCESSORY, OFF, ON and START positions only during energization of the solenoid and consequent retraction of a spring-loaded locking pin from the locking block. A modified locking block enables actuation of the ignition switch between the LOCK and ACCESSORY positions when the solenoid is de-energized.

8 Claims, 4 Drawing Figures

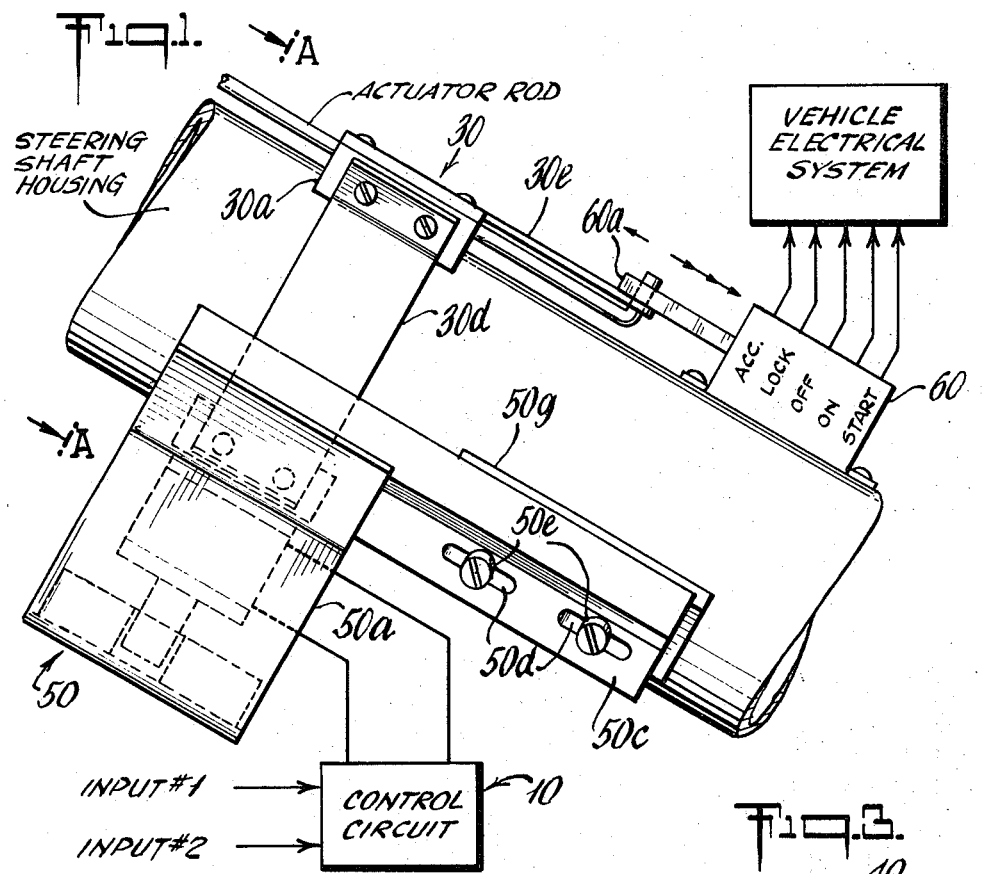
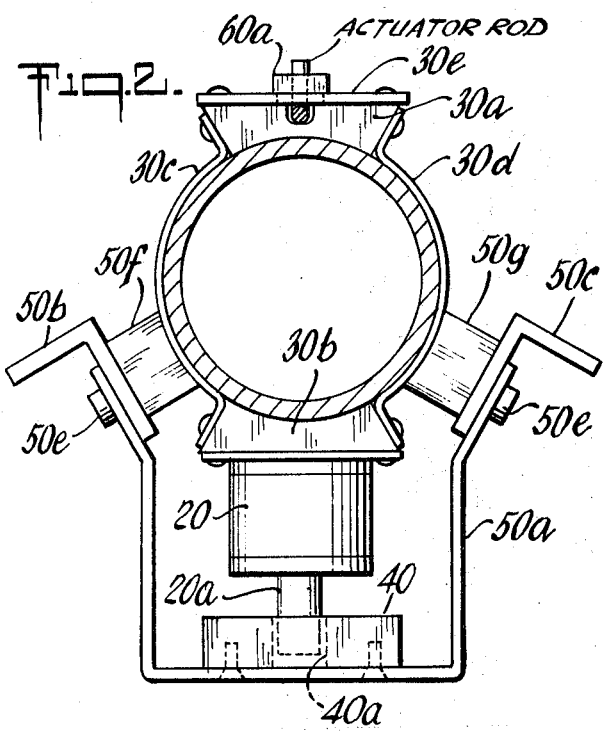
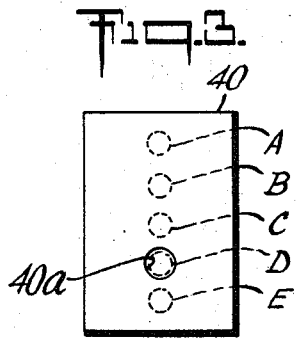
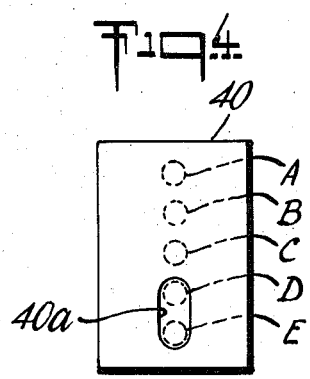

AUTOMOTIVE SECURITY SYSTEM AND SOLENOID LOCK FOR SAME

CROSS-REFERENCE TO RELATED APPLICATION

The system disclosed herein preferably incorporates the circuitry disclosed and claimed in U.S. Ser. No. 289,283 entitled POWER CONTROL CIRCUIT FOR AUTOMOTIVE VEHICLES AND THE LIKE filed on Sept. 15, 1972 in the name of Francis A. McGuirk, Jr.

BACKGROUND OF THE INVENTION

The present invention relates to a security system for controlling the actuation of the ignition switch in an automotive vehicle. Since the mechanism for actuating the ignition switch enables or disables use of the gearshift and steering wheel in more modern vehicles, the present system also controls these functions. Thus, the present system poses a strong deterrent to unauthorized personnel who attempt to operate any vehicle incorporating the system. The system is operative, upon performance of a predetermined sequence of acts, to cause energization of a solenoid lock, thus enabling the ignition switch to be actuated from the LOCK position to the OFF, ON and START positions. Where the ignition switch has an ACCESSORY position, the present system may require solenoid energization before the switch can be actuated from the LOCK position to the ACCESSORY position, or the switch may be actuatable between the LOCK and ACCESSORY positions without energizing the solenoid. The solenoid lock incorporated in the system is preferably mounted on the steering column, in a location which is inaccessible to unauthorized personnel. The present system and solenoid lock may be incorporated into a vehicle as original equipment, or may be retrofitted into older vehicles.

SUMMARY OF THE INVENTION

The present invention is embodied in and carried out by a security system incorporating a solenoid lock, which when de-energized, prevents actuation of a multi-position switch from a predetermined position. The solenoid lock comprises a solenoid and a locking block which are relatively moveable. The solenoid has a retractable locking pin extending therefrom, and the locking block has a recess into which said locking pin extends when the solenoid is de-energized and the solenoid is in a predetermined position with respect to the locking block. Optionally, the locking block recess may be extended to enable limited actuation of the multi-position switch without prior energization of the solenoid.

BRIEF DESCRIPTION OF THE DRAWINGS

The present invention may be better understood by reading the written description thereof with reference to the accompanying drawings, in which:

FIG. 1 illustrates the system disclosed herein, showing a detailed side view of the relatively-moveable solenoid and locking block as mounted on a steering column in an automotive vehicle;

FIG. 2 is an end view of the solenoid lock taken through line A—A of FIG. 1;

FIG. 3 is a plan view of a first type of locking block; and

FIG. 4 is a plan view of a second type of locking block.

DESCRIPTION OF THE PREFERRED EMBODIMENTS

Referring now to FIGS. 1 and 2, the system shown incorporates a control circuit 10 operative in response to a plurality of predetermined inputs to generate an energizing signal which is fed to the slidably-mounted solenoid 20. The solenoid 20 is dependent from mounting means 30 which is in slidable engagement with the steering shaft housing of the vehicle. A spring-loaded locking pin 20a extends from solenoid 20 into a recess 40a in locking block 40, which is mounted in fixed relationship to the steering shaft housing by adjustable mounting means 50. A multi-position ignition switch 60 is mounted on the steering shaft housing, and is controlled in known manner by an actuator rod linked to a locking mechanism having the various settings or positions indicated on switch 60. The electrical leads from ignition switch 60 are connected to the vehicle electric system to enable predetermined connections to be made by switch 60.

The locking block 40 is mounted in fixed relationship to the steering shaft housing by a generally U-shaped channel member 50a, to which the locking block 40 is mechanically connected by any suitable means, such as by screws (as shown) so as to facilitate replacement. The channel member 50a is mechanically connected, e.g., by riveting, welding or brazing, to angle members 50b and 50c, each of which has a pair of longitudinally displaced, elongated slots 50d for receiving a pair of mounting bolts 50e. The elongated slots 50d in angle members 50b and 50c enable adjustment of the position of the locking block 40 in directions parallel to the longitudinal axis of the steering shaft housing. The mounting bolts 50e extending through the angle members 50b and 50c are secured in brackets 50f and 50g, which may be portions of an existing member attached to or formed on the steering shaft housing of the vehicle.

The slidable mounting means 30 for the solenoid 20 comprises upper and lower bearing members 30a and 30b interconnected by straps 30c and 30d, which are fastened to the bearing members by any suitable means such as screws, as shown. The actuator rod extends through and in interference fit with a central groove in the upper bearing member 30a to couple with the plunger 60a of switch 60. A generally T-shaped linking member 30e is fastened to the upper surface of bearing member 30a by a set of four screws, or any other suitable means. The narrow portion of linking member 30e is coupled to the upturned end of the actuator rod, which passes through an aperture in the linking member 30e and through an aperture in the plunger 60a of ignition switch 60. Thus, the locking pin 20a is in engagement with the recess 40a in locking block 40 when switch 60 is in the LOCK position or setting. Under this condition, the electrical switch 60 cannot be actuated to either the OFF, ON or START positions without first energizing the solenoid 20 to disengage locking pin 20a from recess 40a in the locking block 40. Depending on whether the locking block as shown in FIG. 3 or in FIG. 4 is used, the ignition switch may or may not be actuable to the ACCESSORY position without prior energization of the solenoid 20 by control circuit 10.

In FIG. 3, the recess 40a in the locking block is shown as having generally the same cross-section as the locking pin 20a, and being of somewhat larger diameter to reduce the criticality of alignment of the solenoid pin with the aperture. The locking pin positions indicated in phantom in FIGS. 3 and 4 as A, B, C, D and E correspond to the START, ON, OFF, LOCK and ACCESSORY positions of ignition switch 60. If the locking pin 20a is in engagement with the recess 40a in the locking block 40 shown in FIG. 3, the ignition switch 60 cannot be actuated from the LOCK position to any other position without prior energization of solenoid 20. Once the solenoid is energized and the ignition switch 60 is actuated to a position in which locking pin 20a is not aligned with recess 40a in locking block 40, the solenoid may be de-energized so that the flat tip of locking pin 20a is urged against the upper surface of locking block 40. Of course, if the ignition switch 60 is returned to the LOCK position, the locking pin 20a will again enter recess 40a, and it will be necessary to energize solenoid 20 again before the ignition switch 60 can be switched from the LOCK position.

In FIG. 4, the modified locking block shown there has an elongated recess 40a which enables actuation of the ignition switch 60 between the LOCK and ACCESSORY positions without prior energization of solenoid 20. Preferably, whatever configuration of locking block is employed, it will present a smooth, relatively frictionless bearing surface for the flat tip of the spring-loaded locking pin 20a to slide on. Thus, the locking block 40 is preferably made of a smooth material such as TEFLON, nylon or a phenolic material. These materials are also preferred for the bearing members 30a and 30b to facilitate their sliding movement along the steering shaft housing.

The advantages of the present invention, as well as certain changes and modifications of the disclosed embodiments thereof, will be readily apparent to those skilled in the art. For example, the positions of the solenoid and the locking block may be reversed, so that the solenoid is fixedly mounted with respect to the steering shaft housing and the locking block is moveably mounted. The system may include a warning light connected to the ACCESSORY lead of ignition switch 60 to give an indication that the ACCESSORY circuit is closed and the power is being consumed. It is the applicant's intention to cover all those changes and modifications which could be made to the embodiments of the invention herein chosen for the purposes of the disclosure without departing from the spirit and scope of the invention.

What is claimed is:

1. In an automotive vehicle comprising a steering shaft housing, an ignition switch having a plurality of positions, and actuating linkage coupled to said ignition switch, the improvement comprising a security system including:
   1. a control circuit operative in response to a plurality of predetermined inputs to generate an energizing signal;
   2. a normally de-energized solenoid having a spring-loaded locking pin and being electrically coupled to said control circuit for receiving said energizing signal;
   3. mounting means slidably engaged with the steering shaft housing of said vehicle and coupled to the ignition switch actuating linkage, said solenoid being mechanically coupled to said mounting means; and
   4. fixed locking means mounted on the steering shaft housing and including a recess for receiving the locking pin when the solenoid is de-energized and the locking pin is in alignment with the recess.

2. The improvement according to claim 1 wherein said locking means is adjustably positionable along the longitudinal axis of said steering shaft housing.

3. The improvement according to claim 2 wherein said locking means comprises a pair of angle members secured to said steering shaft housing by bolts extending through elongated apertures in said angle members, a channel member dependent from said angle members and extending around said solenoid, and a locking plate connected to the portion of the channel member remote from said angle members, said recess being formed in said locking plate.

4. The improvement according to claim 3 wherein said locking plate is formed of a material on which the locking pin may slide when the solenoid is de-energized and the tip of said pin is in abutment with said locking plate.

5. The improvement according to claim 1 wherein said slidable mounting means comprises a linking member mechanically coupled to the ignition switch actuating linkage, an upper bearing member to which said linking member is mechanically coupled, a lower bearing member to which said solenoid is mechanically connected, a pair of straps connected between said bearing members and, in combination therewith, extending around the circumference of the steering shaft housing.

6. The improvement according to claim 5 wherein said upper bearing member includes a groove through which the ignition switch actuating linkage extends under said linking member.

7. The improvement according to claim 3 wherein said recess in said locking plate has a limited cross-section corresponding generally to the cross-section of the locking pin to enable movement of the locking pin parallel to the direction of the steering shaft housing only after prior energization of the solenoid.

8. The improvement according to claim 3 wherein said recess in said locking plate has an elongated cross-section to enable limited movement of the locking pin parallel to the direction of the steering shaft housing so that the ignition switch may be actuated between first and second positions without prior energization of the solenoid.

* * * * *